No. 619,887. Patented Feb. 21, 1899.
G. HENSCH.
DAMPER FOR MECHANICAL MUSICAL INSTRUMENTS.
(Application filed Nov. 26, 1898.)
(No Model.)

Witnesses
Inventor
G. Hensch
by R. Haldan
Attorney

UNITED STATES PATENT OFFICE.

GUSTAV HENSCH, OF DRESDEN, GERMANY.

DAMPER FOR MECHANICAL MUSICAL INSTRUMENTS.

SPECIFICATION forming part of Letters Patent No. 619,887, dated February 21, 1899.

Application filed November 26, 1898. Serial No. 697,556. (No model.)

*To all whom it may concern:*

Be it known that I, GUSTAV HENSCH, a subject of the King of Saxony, residing at Dresden, Saxony, Germany, have invented a certain new and Improved Damper for Mechanical Musical Instruments, of which the following is a specification.

The improved damper is adapted to damp the vibrating tongues of mechanical musical instruments shortly before they are sounded in order that they may give a pure tone.

The improved damper has the advantage that it can be used as well for damping at once two opposite tongues as for damping only one of such tongues.

Figure 1:
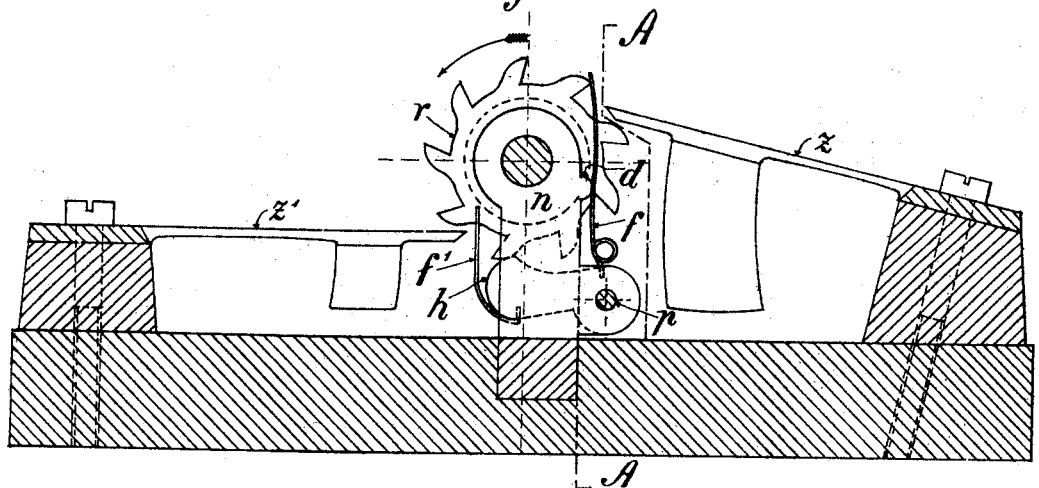
Figure 2:
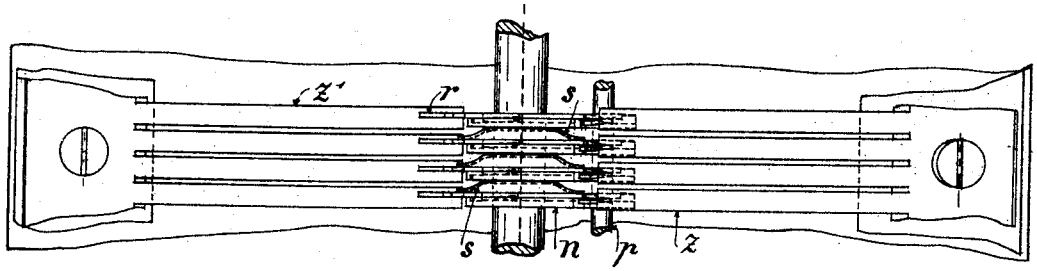
Figure 3:
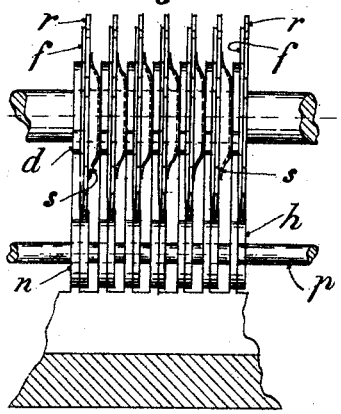

In the annexed drawings, Figure 1 shows this damping arrangement in enlarged elevation with vibrating tongues on both sides; Fig. 2, a plan of Fig. 1, and Fig. 3 a section on line A A of Fig. 1.

As with all hitherto-known dampers, these dampers are of the same number as there are plucking-wheels $r$. The wheels $r$ are movable upon one axle in the wheel-holder $n$, and between them springs $s$, of known form, are arranged. On both sides in the plane of each wheel $r$ is a vibratory tongue $z$ or $z'$, arranged in a position suitable to be sounded by the teeth of the wheel.

The damper consists principally of a lever $h$, movable upon the shaft $p$ and corresponding with a wheel $r$, and of springs $f\ f'$, fastened upon this lever $h$. As shown in Fig. 1, the springs $f\ f'$ are so fastened on the lever $h$ that each rises before the free end of one of the tongues $z\ z'$. The spring $f$ leans against the boss $d$ on the wheel-holder $n$ and causes the lever $h$ to bear against the periphery of the wheel $r$ in the position of Fig. 1, in which the springs $f\ f'$ are a little distant from the end of the tongues $z\ z'$. The spring $f$, as well as the spring $f'$, lies elastically against one side of the wheel $r$. The lever $h$ is so arranged that when the wheel $r$ is turned its teeth slide over the free end of the lever $h$, each tooth of the wheel $r$ pushing the lever $h$ so far downward that the spring $f'$ is guided in the same direction as lever $h$ against the tongue $z'$, and the spring $f$, because it leans against the elevation $d$, is deflected, so that its upper end bends in the opposite direction from its lower part and bears against the tongue $z$, thus damping the two tongues $z\ z'$ at the same time. Every time after a tooth of the wheel $r$ slides off from the lever $h$ this latter is pushed back in its original position by the spring $f$, removing the springs $f\ f'$ from the tongues $z\ z'$, whereupon the latter are sounded each by another tooth of the wheel $r$.

Instead of damping two opposite tongues at the same time the damping arrangement can be used to damp only one tongue—that is to say, it can be used for musical instruments having tongues only on one side of the wheels $r$. In this case it may be used unaltered, or the spring $f'$ may be omitted.

I claim as my invention—

1. In a mechanical musical instrument the combination with the vibratory tongues and plucking-wheels of a series of levers $h$ each adapted to be vibrated in a direction away from the respective tongue by passage of a tooth of the plucking-wheel, a spring attached to said lever and a stationary abutment for said spring in a position between the lever and the tongue whereby the deflection away from the tongue of that part of said spring which is between the lever and the abutment is converted into a deflection toward the tongue of that part of the spring between the abutment and the tongue.

2. In a mechanical musical instrument the combination with two series of vibratory tongues and a series of plucking-wheels each adapted to operate a tongue of each series of tongues of a series of stationary abutments and a series of pivoted levers adapted each to be vibrated in the plane of the wheel by passage of a tooth thereof a spring attached to each lever adapted on outward movement thereof by a wheel-tooth to damp the tongue of one series and another spring attached to said lever and adapted on the same movement to be deflected against the corresponding stationary abutment whereby its outer part is deflected in the opposite direction against the corresponding tongue of the other series.

In witness whereof I have signed this specification in the presence of two witnesses.

GUSTAV HENSCH.

Witnesses:
JULIUS MARGUERZ,
RUDOLPH FRICKE.